United States Patent
Naaman et al.

(10) Patent No.: US 7,739,304 B2
(45) Date of Patent: Jun. 15, 2010

(54) CONTEXT-BASED COMMUNITY-DRIVEN SUGGESTIONS FOR MEDIA ANNOTATION

(75) Inventors: Mor Naaman, San Francisco, CA (US); Marc E. Davis, San Francisco, CA (US); Shane P. Ahern, Foster City, CA (US); Simon P. King, Berkeley, CA (US); Rahul Nair, Oakland, CA (US); Jeannie Hui-I Yang, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 247 days.

(21) Appl. No.: 11/672,901

(22) Filed: Feb. 8, 2007

(65) Prior Publication Data

US 2008/0195657 A1    Aug. 14, 2008

(51) Int. Cl.
G06F 7/00 (2006.01)
G06F 17/30 (2006.01)

(52) U.S. Cl. .................. 707/784; 707/767; 715/231; 715/233

(58) Field of Classification Search .......... None
See application file for complete search history.

(56) References Cited

U.S. PATENT DOCUMENTS

| | | | |
|---|---|---|---|
| 6,173,287 B1 * | 1/2001 | Eberman et al. ................ 1/1 |
| 6,804,684 B2 * | 10/2004 | Stubler et al. ............. 707/104.1 |
| 6,819,797 B1 | 11/2004 | Smith et al. |
| 6,842,761 B2 | 1/2005 | Diamond et al. |
| 7,028,253 B1 * | 4/2006 | Lieberman et al. .......... 715/232 |
| 7,051,275 B2 | 5/2006 | Gupta et al. |
| 2002/0152267 A1 | 10/2002 | Lennon |
| 2002/0198909 A1 * | 12/2002 | Huynh et al. ............... 707/513 |
| 2003/0051214 A1 * | 3/2003 | Graham et al. .............. 715/512 |
| 2003/0196164 A1 * | 10/2003 | Gupta et al. ............. 715/500.1 |
| 2004/0172593 A1 * | 9/2004 | Wong et al. ................. 715/512 |
| 2004/0205542 A1 * | 10/2004 | Bargeron et al. ............ 715/512 |
| 2005/0055628 A1 * | 3/2005 | Chen et al. ................... 715/512 |
| 2006/0161867 A1 * | 7/2006 | Drucker et al. .............. 715/810 |
| 2006/0173909 A1 * | 8/2006 | Carlson et al. ........... 707/104.1 |
| 2007/0233668 A1 * | 10/2007 | Osipov .......................... 707/5 |
| 2007/0266304 A1 * | 11/2007 | Fletcher et al. .......... 715/500.1 |

OTHER PUBLICATIONS

How to annotate an Image? The need of an image annotation guide agent, JCDL' 04 Jun. 7-11, Lee et al.*

(Continued)

*Primary Examiner*—Pierre M Vital
*Assistant Examiner*—Augustine Obisesan
(74) *Attorney, Agent, or Firm*—Weaver Austin Villeneuve & Sampson LLP

(57) ABSTRACT

Disclosed are apparatus and methods for facilitating annotation of media objects by a user. Mechanisms present a user with an easily usable set of annotation suggestions that are most likely to be relevant to the particular user and/or media context. In general, existing annotations are analyzed to determine a set of suggested annotations. Annotation suggestions for a particular user are based on an analysis of the relevance, to the particular user, of existing annotations of one or more media objects so that the most likely relevant annotations are presented as suggested annotations. In particular embodiments, this analysis depends on whether the existing annotations were created and/or selected by the particular user, a member of the particular user's social network, or members of the general public.

33 Claims, 6 Drawing Sheets

OTHER PUBLICATIONS

Digital Graffiti: Public annotation of multimedia content, CHI 2004 Apr. 24-29, Carter et al.*

Automating Photo Annotation using Services and Ontologies, Monaghan et al, Proceedings of the 7th International Conference on Mobile Data Management (MDM'06) 2006.*

Photo Annotation on camera phone, Wilhelm et al, CHI Apr. 24-29, Vienna, Austria 2004.*

Confoto: Browsing and annotating conference photos on the semantic web, Nowack et al, Science, Service and Agent on the world wide web 4 (2006) p. 263-266, 2006.*

User system cooperation in document annotation based on information extraction, Ciravegna et al, EKAW 2002, LNAI 2473, p. 122-137, 2002.*

U.S. Appl. No. 11/671,355, filed Feb. 5, 2007.

Sarvis and Herrate et al., Metadata Creation System for Mobile Images, *MobiSys* '04, Jun. 6-9, 2004, Boston, MA, 2004; pp. 36-48.

Naaman et al., From Where to What: Metadata Sharing for Digital Photographs with Geographic Coordinates, Standford University Vistor Center, 2005, pp. 1-21.

Notification of Transmittal of the International Search Report and the Written Opinion of the International Searching Authority dated Jun. 23, 2008 from PCT International Application No. PCT/US2008/051477.

* cited by examiner

CONTEXT-BASED COMMUNITY-DRIVEN SUGGESTIONS FOR MEDIA ANNOTATION

BACKGROUND OF THE INVENTION

The field of the present invention relates generally to manipulation of media objects or the like, such as photographs, video, audio files, and websites. More particularly, it relates to associating annotations with media objects.

Consumer photography has made it exceedingly simple for people to capture images, which they do at an increasing rate. The growing rate of photo capture is driven by the proliferation of capture devices (such as digital cameras and cameraphones) as well as decreasing storage costs. At the same time, however, creation of semantic metadata about the photo content that is relevant to the content or context of the media's capture environment remains an elusive goal. This type of metadata is required in order to facilitate retrieval from large collections of photographs and media. Completely automated tools for annotating media, though improving, have not proven sufficient in providing complete and accurate semantic metadata. Manual annotation interfaces, even on desktop computers, remain time-consuming, often presenting the user with an overwhelming number of photos to annotate with custom created annotations.

Accordingly, improved mechanisms for facilitating media annotation as performed by a user are needed.

SUMMARY OF THE INVENTION

Accordingly, apparatus and methods for facilitating annotation of media objects by a user are provided. Mechanisms present a user with an easily usable set of annotation suggestions that are most likely to be relevant to the particular user and/or media context. In general, existing annotations are analyzed to determine a set of suggested annotations. Annotation suggestions for a particular user are based on an analysis of the relevance, to the particular user, of existing annotations of one or more media objects so that the most likely relevant annotations are presented as suggested annotations. In particular embodiments, this analysis depends on whether the existing annotations were created and/or selected by the particular user, a member of the particular user's social network, or members of the general public.

In one embodiment, a method of facilitating media annotation is disclosed. The method includes the following operations: (a) for a particular user, analyzing a set of existing free-form annotations that are associated with a plurality of media objects based on a context and the social community of the particular user so as to determine a ranked list of annotations that is ordered by likely relevance to the context of the particular user; and (b) presenting a highest ranked subset of the ranked list of annotations to the particular user as a list of suggested annotations that are selectable by the user to annotate one or more media objects.

In a further aspect, operations (a) and (b) are periodically repeated for the particular user so as to dynamically update the list of suggested annotations based on the context and the social community of the particular user as changes occur to the set of existing annotations. In a specific implementation, operations (a) and (b) are repeated after expiration of a predefined time period. In another implementation, operations (a) and (b) are repeated when the particular user changes a location. In another embodiment, the existing annotations are associated with multiple sources. In a further aspect, the multiple sources include two or more of a media object organization source, a personal media object collection source, a web-based media object collection source, a blog source, or a webpage source In an alternative embodiment, the ranked list of annotations is based on prioritizing the existing annotations into decreasing levels of relevance based on whether each existing annotation was used by the particular user, a member of the particular user's social network, or the general public. In a further aspect, each annotation of the ranked list of annotations is associated with a current location of the particular user. In yet a further aspect, the ranked list of annotations is based on prioritizing the existing annotations into increasing levels of relevance based on how recently in time the existing annotations were selected or used.

In a specific implementation, the ranked list of annotations is based on parsing through at least some of the existing annotations to extract text that is suitable for annotating or describing a media object. In another embodiment, the suggested annotations are presented in a manner that is based on the type of device on which the suggested annotations are being presented. In yet another aspect, the existing annotations are analyzed without requiring that the existing annotations have a fixed format or belong to a fixed category. In another implementation, presenting the suggested annotations includes storing the suggested annotations for access by the particular user. In yet another aspect, presenting the suggested annotations includes displaying the suggested annotations on a display of a device that is being used by the particular user.

In a specific implementation, analyzing the set of existing annotations is accomplished by assigning different weight values to each existing annotation that is associated with different ones of the following categories: (i) existing annotations that were used or selected by the particular user, (ii) existing annotations that were used or selected by a member of the particular user's social network, and (iii) existing annotations that were used or selected by a member of the general public, wherein the weight value for the category (i) is higher than the weight value for the category (ii) which is higher than the weight value for the category (iii). Different weight values are assigned to existing annotations that are within different predefined time periods or for one or more specific time periods, wherein the weight values are higher for more recent time periods than for less recent time periods. A total of the weighted counts of each similar annotation are determined from the existing annotations. The totals are ranked from highest total to lowest total to form the ranked list of suggested annotations.

In another embodiment, the invention pertains to an apparatus having a processor and a memory that is configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Figure 1A:
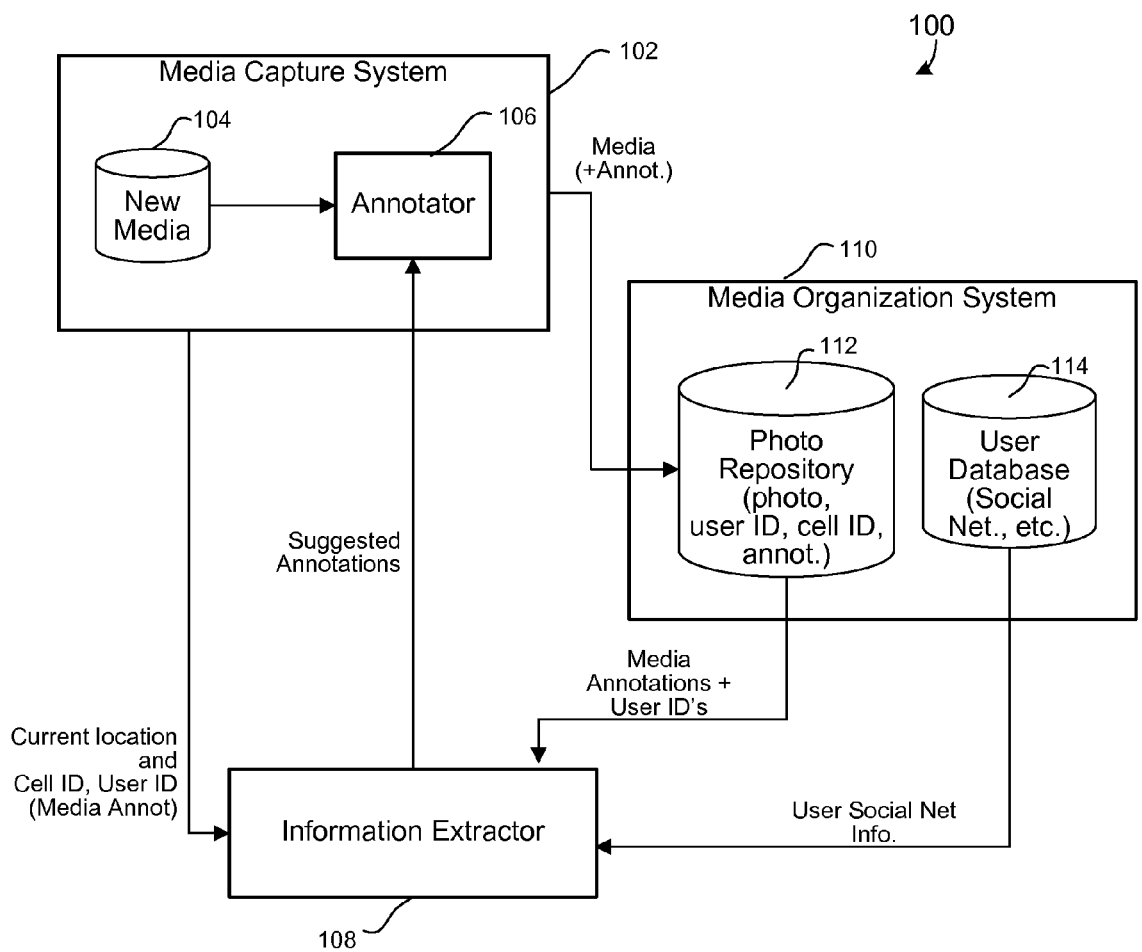
FIG. 1A is a diagrammatic representation of a system for presenting suggested annotations for media objects in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention provide to a particular user one or more suggestions for annotating a media object, such as a digital photograph or video. Annotation suggestions for a particular user are based on an analysis of the relevance, to the particular user, of existing annotations of one or more media objects so that the most likely relevant annotations are presented as suggested annotations. The existing annotations that are analyzed could have been created and/or selected by the particular user, a member of the particular user's social network, or members of the general public. In particular embodiments, the existing annotations are prioritized into decreasing levels of user relevance based on whether the existing annotations were created or selected by the particular user, a member of the particular user's social network, or a member of the general public.

Additionally, annotations are suggested to a particular user in a dynamic manner so that the suggested annotations are updated over time as changes occur to the available, existing annotations and their relationship with the particular user. By way of examples, the set of suggested annotations changes as new annotations are added to (or removed from) media or as the particular user's social network removes or adds new members that have provided various annotations.

Although the following description is directed specifically to analyzing the annotation or tags of media type objects, such as photos, video, and audio files, it is noted that annotations can be utilized for other types of objects, such as executable files, text documents, web pages, etc. A suggested or actual media annotation may take any form, such as text, symbol, or icon. The particular user to which the suggestions are presented may be an automated entity or an actual person.

Although certain example implementations are described herein as including techniques for analyzing the annotations of only media objects that are also associated with a particular cell ID (or cellular position) to determine a set of suggested annotations, media objects that have one or more other characteristics in common, such as a same location annotation, may be analyzed so as to determine a set of suggested annotations for a particular user. Alternatively, the annotations of all available media objects may be analyzed irrespective of a common characteristic such as location or cell ID.

FIG. 1A is a diagrammatic representation of a system 100 for presenting suggested annotations for media objects in accordance with one embodiment of the present invention. The network can include a media capture system 102 for generating new media, a media organization system 110 for retaining and organizing media, and an information extractor 108. Some or all of the functionality of the components of network 100 may be integrated together or implemented separately on different software and/or hardware. For example, the media organization system may be in the form of application software on a user's personal computer or camera-phone or on a server that is accessible via a wide area network, such as the Internet. The media capture system may be in the form of an application on a camera type device, such as a camera or camera-phone. One example of a suitable media capture system that allows annotation of media is ZoneTag available from Yahoo! Inc. of Sunnyvale, Calif. The information extractor 108 may take the form of a stand-alone server application or be integrated in the media capture and/or media organization application.

The media capture system 102 may include one or more media 104 and an annotator 106. The media 104 may include media, such as photos, that have been newly or previously captured. The annotator 106 allows a user to annotate one or more of media 104. In embodiments of the present invention, the user is presented with a list of suggested annotations to associate with one or more media objects.

Media may be stored in a media organization system, such as Flickr available from Yahoo! of Sunnyvale, Calif. As shown, media organization system 110 may include a photo repository 112 for holding media and a user database 114 for retaining user information. The media and user databases may be in the form of one or more databases that are located internal or external to the media organization system. One or more of the media that is retained in the photo repository 112 may be associated with data, such as a user ID, cell ID, and one or more descriptive annotations, such as location and time information. The user database 114 may include data structures that specify user ID's that belong to each particular user' social network.

Although embodiments of the present invention are described in relation to a media organization system for organizing digital photos and a media capture system on a portable device, techniques of the present invention for suggesting annotations may be practiced in any suitable environment in which media annotations can be used. Additionally, the examples described herein refer to photo type media objects although the techniques of the present invention may be practiced with respect to any suitable type of media object.

The information extractor 108 generally operates to pull information from one or more media information sources to then determine a list of suggested annotations to present to a particular user or user device. The media information may be pulled or obtained from various sources that relate information to media. The media information that is used by the information extractor may be grabbed by the information extractor from one or more sources, and/or media information may be sent by one or more sources to the information extractor. As shown, the information extractor 108 obtains a current photo location, current cell ID, user ID, and media annotations (if present) from media capture system 102. The information extractor 108 also obtains media annotations and user ID information from photo repository 112 and user social network information from user database 114 of media organization system 110.

For a particular user, the information extractor 108 then analyzes the obtained media information to provide a list of suggested annotations to the particular user, for example, in media capture system 102. In general, the information extractor 108 analyzes the media information to rank annotations based on relevance to the particular user. A particular existing annotation's relevance depends on any suitable factor that is personable to the particular user. For example, an existing annotation's relevance to the particular user may depend on whether it was used by the particular user or a member of the user's social network, whether such annotation was used in the same location or cell ID in which the particular user is located, or how recently the annotation has been used.

Figure 1B:
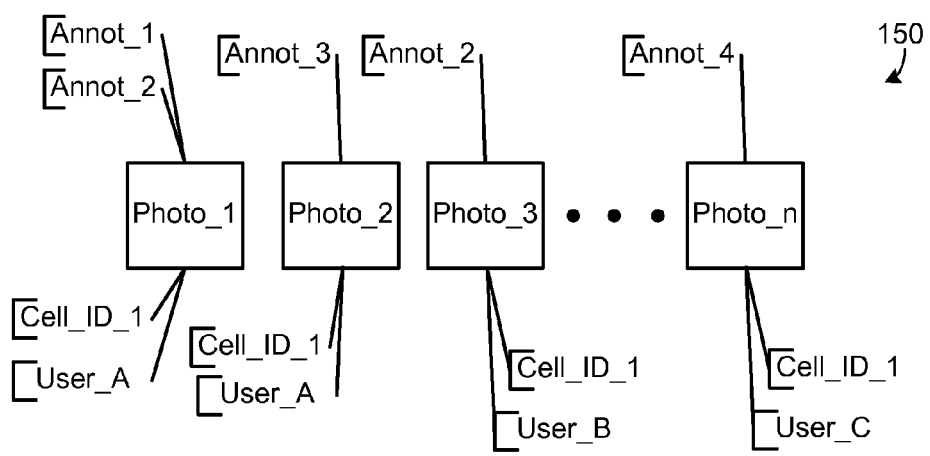
FIG. 1B is a diagrammatic representation of a plurality of media objects associated with various information components in accordance with one embodiment of the present invention.

The media information that is analyzed by the information extractor may take any suitable form. FIG. 1B is a diagrammatic representation of a plurality of media objects 150 associated with various information components in accordance with one embodiment of the present invention. Each photo is associated with one or more annotations and/or data parameters. In one embodiment, each photo is associated with a cellular identity (cell ID) that corresponds to the cellular tower that had the closest proximity to the photo during the photo's capture time period. For example, a camera-phone is periodically updated with the cell ID of the closest cell tower so that when a photo is captured with the camera-phone, the photo can be annotated with the cell ID of the last update. As shown, all of the photos (i.e., photo_1 through photo_n) are associated with the same cell ID designated as "cell_ID_1." Alternatively or additionally, each photo may be associated with any type of location identity such as a location tag that is selected by the user or a GPS (global position satellite) location that is obtained by a GPS device and associated with the photo.

Each photo may typically also be associated with a user identity (ID) that corresponds to the user who captures, annotates, and/or uploads the photo. In the illustrated example, photo_1 and photo_2 correspond to User_A; photo_3 corresponds to User_B; and photo_n corresponds to User_C. The user associated with a particular photo may correspond to the particular user for whom the suggested annotations are being generated, a member of the particular user's social network, or a member of the general public (e.g., not the particular user or not in the user's social network). For example, User_A may correspond to the particular user, who is having suggested annotations generated; User_B is within User_A's social network; and User_C is a member of the general public (e.g., not in User A's social circle).

Each photo may also be associated with one or more annotations. Two different photos may have the same and/or different annotations. As shown, photo_1 and photo_2 both have an annotation [Annot_2], while photo_1 has the additional annotation [Annot_1]. Photo_3 has the annotation [Annot_2], while photo_n has the annotation [Annot_4].

Figure 2:
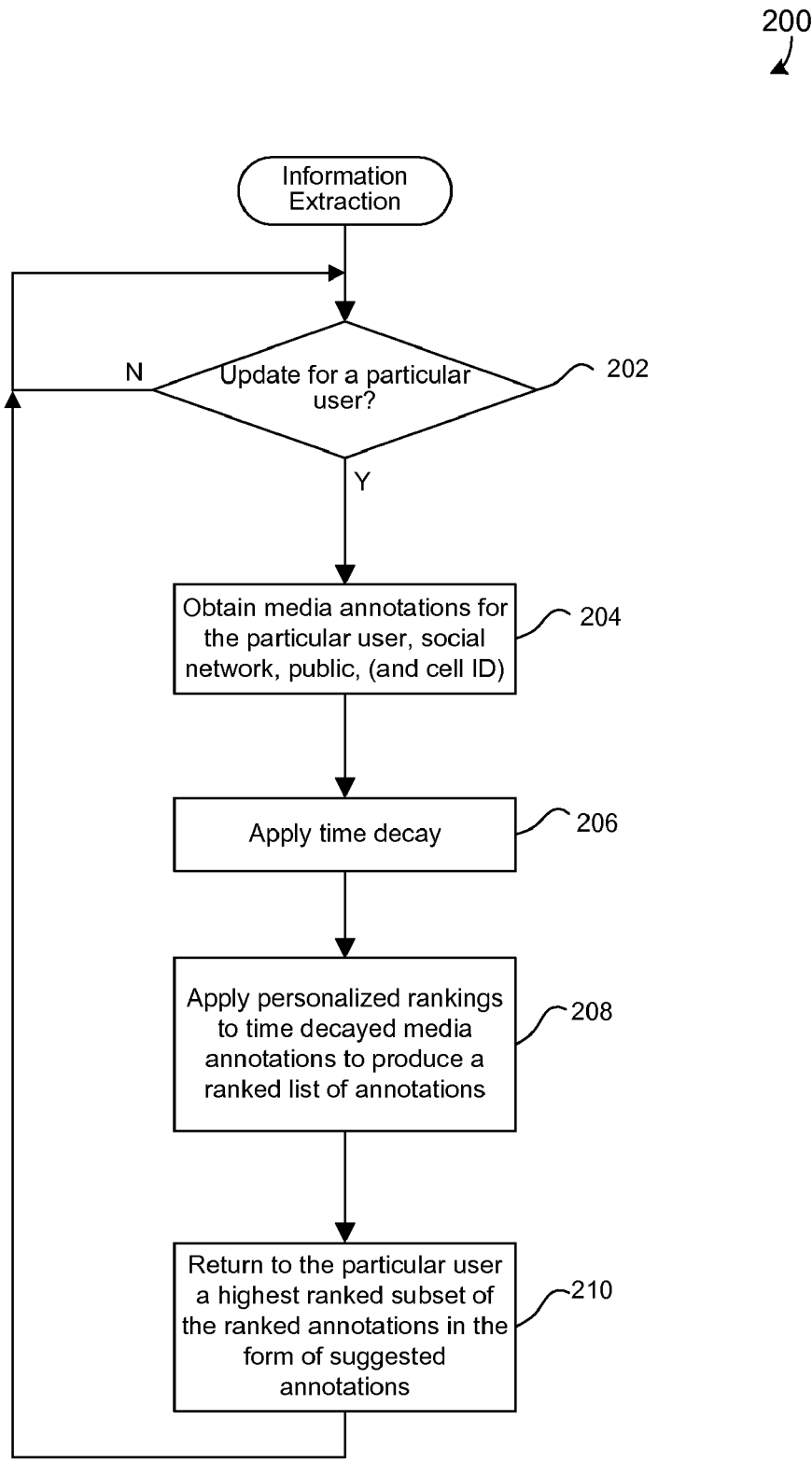
FIG. 2 is a flow chart illustrating an information extraction procedure in accordance with one implementation of the present invention.

FIG. 2 is a flow chart illustrating an information extraction procedure 200 in accordance with one implementation of the present invention. Initially, it is determined whether an update should occur for a particular user in operation 202. That is, it is determined whether an initial or updated set of suggestions should be generated and presented to the particular user. That is, new sets of suggested annotations may be periodically and continuously generated for the particular user based on any suitable trigger. For example, an update may be triggered when the particular user changes his/her location (e.g., changes cell ID with respect to the user's camera-phone). Alternatively, an update may automatically occur every predefined time period, such as every 10 minutes or any other suitable time period. If an update is not to occur, the procedure 200 simply waits for the update trigger.

When an update is to occur, media annotations that correspond to the particular user, user's social network, public, and possibly cell ID, are obtained in operation 204. All existing annotations may be obtained, irrespective of the particular user's current cell ID location. However, existing annotations that are associated with the current cell ID may be more likely relevant to the particular user.

Annotations may be gathered from any suitable source and from multiple sources, such as information on a media organization system, a personal media collection source, a web-based media collection source, a blog associated with a photo, a captions of a photo, text on a web page that is proximate to a photo, a tag associated with a photo, etc. For example, the information extractor 108 can search the photo repository 112 of media organization system 110 and the new media 104 of media capture system 102 to find all the annotations in the following categories: (i) all annotations that are associated with the current cell ID and the particular user (e.g., were created or modified by the particular user), (ii) all annotations that are associated with the particular cell ID and members of the particular user's social network, and (iii) all annotations that are associated with the current cell ID. In a specific embodiment, the repository database relates each photo to a specific cell ID (or other location), user ID, and one or more annotations. The members in the particular user's social network can be obtained from the user database 114. The annotations that correspond to a photo that also has the same user ID as the particular user (as well as the current cell ID) can be categorized into group (i), while an annotation that corresponds to a user ID within the particular user's social network can be categorized into category (ii). Finally, all annotations that merely correspond to a photo associated with the current cell ID can belong to category (iii).

Existing annotations may also be obtained by performing text analysis on text strings that associated with certain photos. Text analysis may generally extract annotation text that is suitable for annotating or describing a media object, such as a photo or video. For instance, each text string that is associated with each photo may be parsed to extract nouns, adjectives, and/or proper nouns.

After existing annotations are obtained for a particular user, time decay may also be applied in option 206. For instance, the existing annotations may be filtered to only include the annotations that were used recently, e.g., within a particular time period, such as the last 2 days. Alternatively, the annotations may be weighted based on age with the oldest annotations given a lower weight than the newest annotations.

Personalized rankings may then be applied to the time decay media annotations to produce a ranked list of annotations in operations 208. For instance, the obtained existing annotations may be weighted based on which category (i), (ii), or (iii) into which they belong. The time decay and personal rankings may be applied together with respect to the obtained existing annotations. A detailed implementation example is described further below.

A highest ranked subset of the ranked annotations is then returned to the particular user in the form of suggested annotations in operation 210. The subset that is presented may be based on the type of device to which the suggestions are sent. For instance, a device that has a relatively small memory and/or display, such as a camera-phone may receive a smaller sized suggested annotation list than a device with a larger memory or display personal computer. A smaller sized device may also receive the suggested annotations in a tabbed format so as to condense the list further. For instance, different tabs may display different categories of suggested annotations such as the most popular annotations, most recent annotations, the most relevant annotations, etc. In the example of FIG. 1A, suggested annotations may be presented to a user of the media capture system or the media organization system. Of course, suggested annotations may be presented to a particular user in any suitable manner. By way of examples, the suggested annotations can be displayed on a display of any suitable device, stored on any device for later access by the user, etc.

The procedure for suggesting annotations may then be repeated. That is, the suggested annotations may be dynamically adjusted to reflect current changes in the existing annotations in the annotations used by the particular user and the user's social network. For example, the particular user associates one or more of the suggested annotations with his/her photos or generates a new annotation. The user's social network members may do the same. The new set of annotations is then analyzed along with the other existing annotations to form a new set of suggested annotations. For example, new annotations may become more popular and move up in the ranked list of suggested annotations as their popularity increases. Said in another way, the system for suggesting annotations is an open system that is capable of accepting a wide variety of new annotations for analysis. The analyzed existing annotations can also be free form annotations that do not have a fixed format and do not belong to fixed categories.

The analysis of annotations could also include consideration of the user's past activities in determining a user's preference for suggested annotations. For example, if a particular user more frequently selects annotations from a specific user as compared with selecting annotations from other users, the specific user's annotations may be given a higher weight than other user's annotations when determining which annotations to present as suggested annotations. In another example, if a particular user more frequently selects annotations from members of his/her social network as compared with his/her own annotations, then annotations from the user's social circle may be weighted more heavily than his/her own annotations to determine a set of suggested annotations. A user's selection of one or more specific categories of annotations may also affect the analysis of such annotations categories. That is, annotations in a category that were selected more frequently than other categories of annotations may be weighted more heavily than these other annotation categories so as to determine suggested annotations. In sum, a particular user's activities can serve as feedback for the information extractor to determine suggested annotations.

Figure 3A:
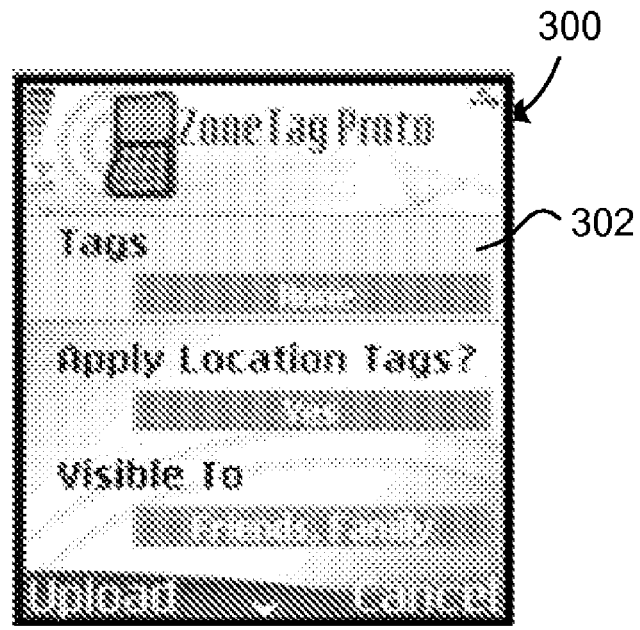
FIG. 3A is a screen shot of a user interface on a camera-phone for selecting a tagging option in accordance with one implementation.
Figure 3B:
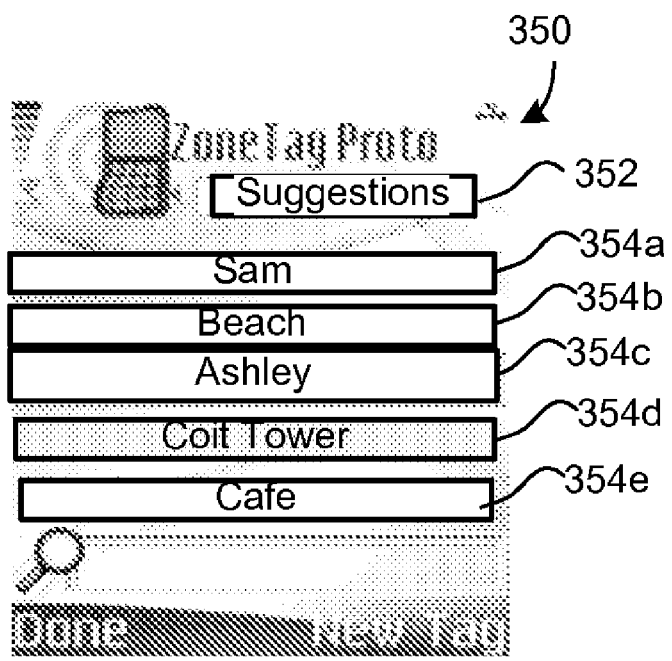
FIG. 3B is a screen shot of a user interface after a user has selected the tagging option of FIG. 3A in accordance with one implementation.

FIG. 3A is a screen shot of a user interface 300 on a camera-phone for selecting a tagging option 302 in accordance with one implementation. A user may select the "Tags" option 302 by any suitable input mechanism, such as a hard button, touch screen soft button, or a stylus. FIG. 3B is a screen shot of a user interface 350 after a user has selected the Tags option 302 of FIG. 3A in accordance with one implementation. As shown, a list of suggested tags 354 (labeled as 352) is presented. This list of suggested tags may represent a subset of the total possible tags and are presented in a ranked order. As shown, the suggested tag "Sam" 354a likely represents a tag that was previously used by the particular user of the camera-phone to tag a media object. For instance, the tag "Sam" may represent a relative or friend of the particular user that was used to annotate a high number of photos of the particular user. The next suggested tags "Beach" 354b and "Ashley" 354c may also be annotations previously used by the particular user to tag the user's photos. In contrast, the suggested tags "Coit Tower" 354d and "Café" 354e may be tags that were previously used by the particular user's social group with respect to the current cell ID. For example, the particular user may be near a cell tower that is also near the Coit Tower and Café.

The user interface for selecting tags may include any mechanisms to facilitate annotation of media. For instance, a plurality of media objects may be selected for adding a same tag, rather than tagging one media object at a time. Additionally, when a particular media object is being tagged, the last tag that was used for the previous media object may be automatically added to the current media object or the previous annotation may simply be presented for easy selection by the user. In other embodiments, when a user starts to enter text for an annotation, the remainder of the text for one of the suggested annotations is filled-in by an automated text completion procedure. Alternative, a user may click an input device over a specific annotation to cause it to be associated with a particular media object.

Figure 4:
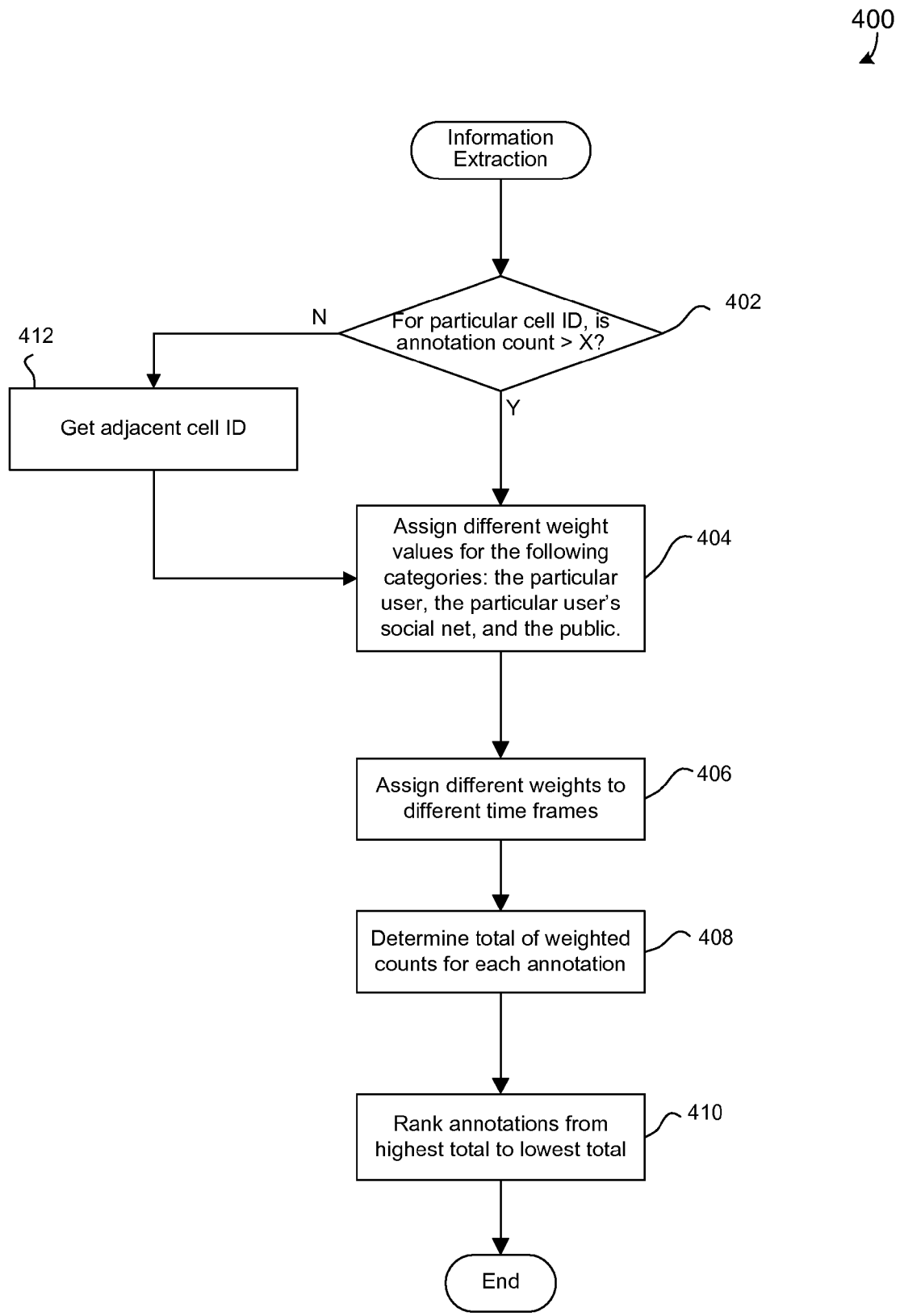
FIG. 4 is a flow chart illustrating a detailed information extraction procedure in accordance with a specific embodiment of the present invention.

FIG. 4 is a flow chart illustrating a detailed information extraction procedure 400 in accordance with a specific embodiment of the present invention. In this example, a ranked list of suggested annotations is compiled based on weighting existing annotations based on factors that relate to user relevance and then counting the differently weighted annotations to determine which annotations are more valuable for the user.

Initially, it may be determined whether the total annotation count for a particular cell ID (or location) is greater then a predefined number, e.g., count "X", an operation 402. That is, it may first be determined whether enough annotations exist for the current cell ID in order to reliable analyze. The predefined threshold for the total annotation count may be determined through experimentation which includes assessing whether certain thresholds produce a reliably relevant list of suggested annotations for a user.

If the annotation count is not high enough, an adjacent cell ID may then be obtained in operation 412. Otherwise this operation is skipped. In other words, if there are not enough annotation for the current cell ID, the existing annotations for an adjacent cell ID may instead be analyzed. An adjacent cell ID may be determined in any number of ways. For instance, each cell tower may be configured with cell ID's of its closest neighbor towers and each cell tower's neighbor cell ID's may be configured in an accessible database.

Different weight values may then be assigned for the following categories: the particular user, the particular user's social network, and the public in operation 404. Different weights may also be assigned to different time frames in operation 406. A total of weighted counts may then be determined for each annotation in operation 408. The annotations may then be ranked from the highest total to the lowest total in operation 401.

In a simple example, a first annotation "Tag1" was previously used by the particular user on a photo two times, while a second annotation "Tag2" was previously used by a member of the user's social network two times and by the general public one time. A third annotation "Tag3" was previously used by a member of the general public three times. Let us assign a weight of 10 to each annotation used by the particular user, a weight of 5 to each annotation of the social network, and a weight of 1 for the general public. In this example, it is assumed that all of the tags were produced or selected in the same weighted time frame. Annotations that were selected in different time frames may be given different weights. The current example produces the following totals (category weight×count):

Total Tag1=20(10×2);

Total Tag2=11(2×5+1×1);

Total Tag3=3(3×1).

Note that Tag1 is ranked higher than Tag2, even though Tag2 had a higher count than Tag1. The Tag1 counts were all used by the particular user, and accordingly received a highest weight of 10, while Tag2 had two counts by the social network, which each received a weight of 5, and 1 count in the general public, which only received a weight of 1.

Other algorithms could be used to practice the current invention. For instance, the ranking does not have to depend on count, but can depend on uniqueness. In a specific example, a cell ID may be associated with a high count of "San Francisco" annotations and a smaller number of "Coit Tower" annotations. The particular user may live in San Francisco and find the more unique name "Coit Tower" to be more relevant as a media annotation. In sum, uniqueness may be a factor in the analysis to produce a ranked list of suggested annotations.

Once a list of suggested annotation is determined, any suitable selection mechanism may be provided to allow a user to select a particular one of the suggested annotations for associating with a media object. By way of example, a user may be presented with a list of suggested annotations and the user can select a particular annotation with an input device, such as a stylus, number pad, mouse, scroll and input button, etc. A touch screen may allow the user to use any pointed object, e.g., stylus or fingernail, to select a particular annotation from a list or to handwrite a particular annotation. The user may drag and drop a selected annotation onto a selected media object. The number pad of the camera-phone may be utilized to enter letters to select a particular annotation. For example, the user selects the letter "d" by tapping the "3" button once and selects the letter "e" by tapping the same "3" button twice. To ease selection, auto completion mechanisms may be utilized to fill-in the remaining letters of a particular suggested annotation after the user has entered one or more letters via the number pad. In another example, the user may simply tap each number button once to form a word and the selection mechanism automatically generates different combinations of letters to determine the most likely corresponding suggested annotation. The user may then have the option to select or refuse this determined annotation. Upon refusal, the next most likely annotation is presented to the user for selection or refusal.

Embodiments of the present invention support location-based sharing of metadata or annotations via the dynamic information extraction techniques and resulting suggested annotations and their use. Allowing metadata to be shared creates an opportunity to leverage community effort to benefit each of the individuals within the community. Additionally, sharing annotations throughout a community presumably leads to some degree of annotation (or tag) convergence, making it easier for individuals to retrieve not only their own media, but others' as well.

Figure 5:
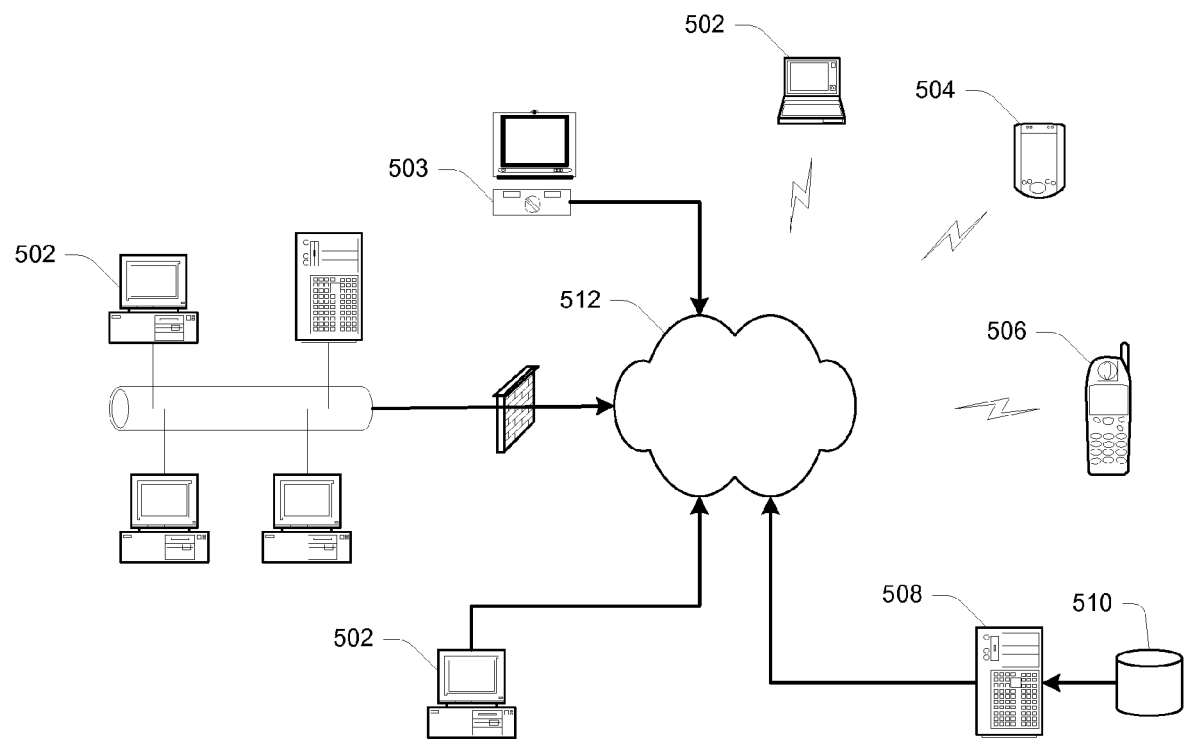
FIG. 5 is a simplified diagram of a network environment in which specific embodiments of the present invention may be implemented.

Embodiments of the present invention may be employed to generate and use suggested annotations in any of a wide variety of computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), hand-held computing devices (e.g., PDAs) 504, cell phones 406, or any other type of computing or communication platform.

And according to various embodiments, objects and their associated annotations that are processed in accordance with the invention may be obtained using a wide variety of techniques. For example, annotation associations representing a user's interaction with a local application, web site or web-based application or service (e.g., associations between objects and their annotations and their parameters) may be accomplished using any of a variety of well known mechanisms for recording a user's behavior. However, it should be understood that such methods of obtaining annotations are merely exemplary and that annotation information may be collected in many other ways. For example, annotation information for various objects may be collected when a user uploads objects or registers with, for example, a particular web site or service.

Once one or more annotations are associated with one or more objects, annotated media objects may be handled according to the invention in some centralized manner. This is represented in FIG. 5 by server 508 and data store 510 that, as will be understood, may correspond to multiple distributed devices and data stores. The invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 6:
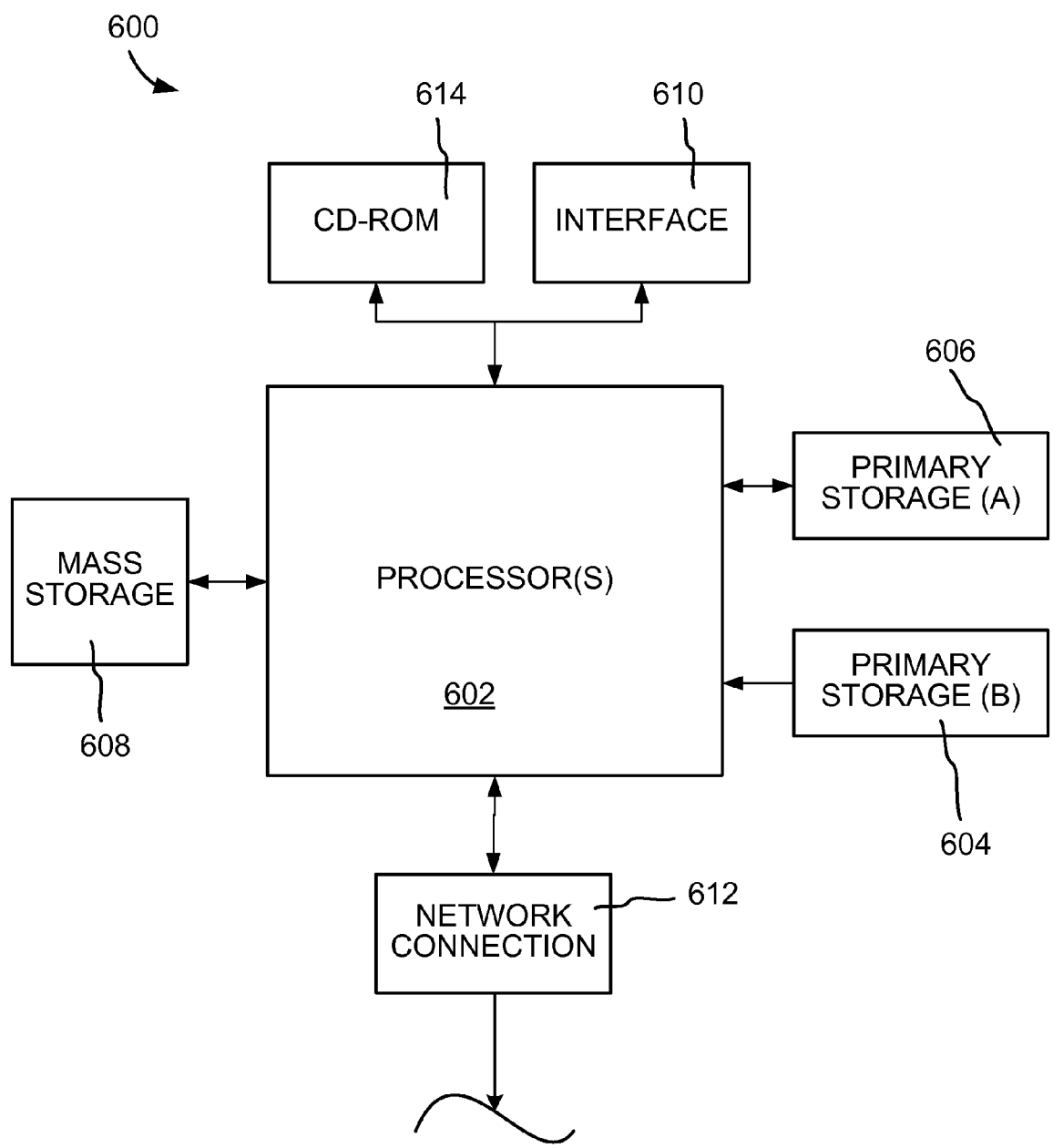
FIG. 6 illustrates a typical computer system that, when appropriately configured or designed, can serve as a system (e.g., information extractor, media capture system, and/or media organization) of this invention.

FIG. 6 illustrates a typical computer system that, when appropriately configured or designed, can serve as a system (e.g., information extractor, media capture system, and/or media organization) of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store the media objects, existing annotations and their relationship to objects, user information and their relationships with objects, location information and their relationship with objects and users, weights for various annotation characteristics, counts of weighted annotations, current cell ID or location of a particular user, other information used for analysis, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Although the above examples describe a user associating annotations with his/her own media objects, of course, a user may also associate annotation with another user's media objects or with media objects that were automatically generated without a user. Therefore, the present embodiments are to be considered as illustrative and not restrictive and the invention is not to be limited to the details given herein, but may be modified within the scope and equivalents of the appended claims.

What is claimed is:

1. A method of facilitating photograph annotation, comprising:
    (a) for a particular photograph object on a device and associated with a particular user identifier (ID) of a particular user, in a photo object repository searching for the particular user ID that has been previously associated with a first set of existing annotations of a plurality of previously annotated photograph objects that relates to a context of the particular photograph object and searching for one or more other user IDs that have been identified by the particular user as belonging to the particular user's social network and that are associated with a second set of existing annotations of a plurality of previously annotated photograph objects that relates to a context of the particular photograph object and searching for one or more general public user IDs that have not been identified by the user as belonging to the particular user's social network and that are associated with a third set of existing annotations of a plurality of previously annotated photograph objects that relates to a context of the particular photograph object;
    (b) ordering the first set, second set, and third set of existing annotations into a ranked list of annotations, wherein the first set of existing annotations is ranked higher in the ranked list than the second set of existing annotations, and wherein the third set of existing annotations is ranked lower than the first and second sets of existing annotations in the ranked list of annotations, wherein ordering is further accomplished by:
        assigning different weight values to existing annotations that are within different predefined time periods, wherein the weight values are higher for more recent time periods than for less recent time periods or for one or more specific time periods,
        determining a total of the weighted counts of each similar annotation from the existing annotations, and
        ranking the totals from highest total to lowest total to form the ranked list of suggested annotations; and
    (c) presenting at the device a highest ranked and ordered subset of the ranked list of annotations to the particular user as a list of suggested annotations that are selectable by the particular user to annotate the particular photograph object.

2. A method as recited in claim 1, further comprising periodically repeating operations (a) through (c) for the particular user so as to dynamically update the list of suggested annotations based on the context and the social community of the particular, user as changes occur to the set of existing annotations.

3. A method as recited in claim 2, wherein operations (a) through (c) are repeated after expiration of a predefined time period, when the particular user changes a location, or when a user initiates operations (a) through (c).

4. A method as recited in claim 1, wherein at least a subset of the first and second set of the existing annotations are associated with multiple sources.

5. A method as recited in claim 4, wherein the multiple sources include two or more of a media object organization source, a personal media object collection, source, a web-based media object collection source, a blog source, or a webpage source.

6. A method as recited in claim 1, wherein each annotation of the ranked list of annotations is associated with a current location of the particular user.

7. A method as recited in claim 6, wherein the ranked list of annotations is further based on prioritizing the existing annotations into increasing levels of relevance based on how recently in time the existing annotations were selected or used.

8. A method as recited in claim 1, wherein the ranked list of annotations is further based on parsing through at least some of the existing annotations to extract text that is suitable for annotating or describing a media object.

9. A method as recited in claim 1, wherein the suggested annotations are presented in a manner that is based on the type, of device on which the suggested annotations are being presented.

10. A method as recited in claim 1, wherein searching and ordering of the first and second sets of the existing annotations are performed without requiring that the existing annotations have a fixed format or belong to a fixed category.

11. A method as recited in claim 1, wherein presenting the suggested annotations includes storing the suggested annotations for access by the particular user.

12. A method as recited in claim 1, wherein presenting the suggested annotations includes displaying the suggested annotations on a display of the device.

13. A method as recited in claim 1, further comprising receiving a selection of a particular annotation by the particular user, wherein the particular user selects the particular annotation from the list of suggested annotations by clicking on or checking the particular annotation with a mouse, stylus or other input mechanism, dragging the particular annotation to the particular photograph object, entering a combination of letters for the particular annotation via a number pad of a portable or cellular phone, entering only a subset of the letters of the particular annotation via the number pad whereby the remaining letters are automatically completed, or entering the letters of the particular annotation by only tapping each number button one time whereby the particular annotation is automatically determined.

14. An apparatus for facilitating photograph annotation, comprising:
at least one a processor; and
at least one memory, the at least one processor and/or memory being configured for:
(a) for a particular photograph object on the apparatus and associated with a particular user identifier (ID) of a particular user, in a photo object repository searching for the particular user ID that has been previously associated with a first set of existing annotations of a plurality of previously annotated photograph objects that relates to a context of the particular photograph object and searching for one or more other user IDs that have been identified by the particular user as belonging to the particular user's social network and that are associated with a second set of existing annotations of a plurality of previously annotated photograph objects that relates to a context of the particular photograph object and searching for one or more general public user IDs that have not been identified by the user as belonging to the particular user's social network and that are associated with a third set of existing annotations of a plurality of previously annotated photograph objects that relates to a context of the particular photograph object;
(b) ordering the first set, second set, and third set of existing annotations into a ranked list of annotations, wherein the first set of existing annotations is ranked higher in the ranked list than the second set of existing annotations and wherein the third set of existing annotations is ranked lower than the first and second sets of existing annotations in the ranked list of annotations, wherein ordering is further accomplished by:
assigning different weight values to existing annotations that are within different predefined time periods, wherein the weight values are higher for more recent time periods than for less recent time periods or for one or more specific time periods,
determining a total of the weighted counts of each similar annotation from the existing annotations, and
ranking the totals from highest total to lowest total to form the ranked list of suggested annotations; and
(c) presenting a highest ranked and ordered subset of the ranked list of annotations to the particular user as a list of suggested annotations that are selectable by the particular user to annotate the particular photograph object, web-based media object collection source, a blog source, or a webpage source.

15. An apparatus as recited in claim 14, the at least one processor and/or memory being further configured for periodically repeating operations (a) through (c) for the particular user so as to dynamically update the list of suggested annotations based on the context and the social community of the particular user as changes occur to the set of existing annotations.

16. An apparatus as recited in claim 14, wherein at least a subset of the first and second set of the existing annotations are associated with multiple sources.

17. An apparatus as recited in claim 16, wherein the multiple sources include two or more of a media object organization source, a personal media object collection source, a web-based media object collection source, a blog source, or a webpage source.

18. An apparatus as recited in claim 14, wherein each annotation of the ranked list of annotations is associated with a current location of the particular user.

19. An apparatus as recited in claim 18, wherein the ranked list of annotations is further based on prioritizing the existing annotations into increasing levels of relevance based on how recently in time the existing annotations were selected or used.

20. An apparatus as recited in claim 14, wherein the ranked list of annotations is further based on parsing through at least some of the existing annotations to extract text that is suitable for annotating or describing a media object.

21. An apparatus as recited in claim 14, wherein the suggested annotations are presented in a manner that is based on the type of device on which the suggested annotations are being presented.

22. An apparatus as recited in claim 14, wherein searching and ordering of the first and second sets of the existing annotations are performed without requiring that the existing annotations have a fixed format or belong to a fixed category.

23. At least one computer readable storage medium having computer program instructions stored thereon that are arranged to perform the following operations:
(a) for a particular photograph object on a device and associated with a particular user identifier (ID) of a particular user, in a photo object repository searching for the particular user ID that has been previously associated with a first set of existing annotations of a plurality of previously annotated photograph objects that relates to a context of the particular photograph object and searching for one or more other user IDs that have been identified by the particular user as belonging to the particular user's social network and that are associated with a second set of existing annotations of a plurality of previously annotated photograph objects that relates to a context of the particular photograph object and searching for one or more general public user IDs that have not been identified by the user as belonging to the particular user's social network and that are associated with a third set of existing annotations of a plurality of previously annotated photograph objects that relates to a context of the particular photograph object;

(b) ordering the first set, second set, and third set of existing annotations into a ranked list of annotations, wherein the first set of existing annotations is ranked higher in the ranked list than the second set of existing annotations and wherein the third set of existing annotations is ranked lower than the first and second sets of existing annotations in the ranked list of annotations, wherein ordering is further accomplished by:

assigning different weight values to existing annotations that are within different predefined time periods, wherein the weight values are higher for more recent time periods than for less recent time periods or for one or more specific time periods, determining a total of the weighted counts of each similar annotation from the existing annotations, and ranking the totals from highest total to lowest total to form the ranked list of suggested annotations; and (c) presenting at the device a highest ranked and ordered subset of the ranked list of annotations to the particular user as a list of suggested annotations that are selectable by the particular user to annotate the particular photograph object.

24. At least one computer readable storage medium as recited in claim 23, the computer program instructions Previously presented being further arranged to periodically repeat operations (a) through (c) for the particular user so as to dynamically update the list of suggested annotations based on the context and the social community of the particular user as changes occur to the set of existing annotations.

25. At least one computer readable storage medium as recited in claim 24, wherein the computer program instructions are further arranged to periodically repeat operations (a) through (c) after expiration of a predefined time period, when the particular user changes a location, or when a user initiates operations (a) through (c).

26. At least one computer readable storage medium as recited in claim 23, wherein at least a subset of the first and second set of the existing annotations are associated with multiple sources.

27. At least one computer readable storage medium as recited in claim 26, wherein the multiple sources include two or more of a media object organization source, a personal media object collection source, a web-based media object collection source, a blog source, or a webpage source.

28. At least one computer readable storage medium as recited in claim 23, wherein each annotation of the ranked list of annotations is associated with a current location of the particular user.

29. At least one computer readable storage medium as recited in claim 28, wherein the ranked list of annotations is further based on prioritizing the existing annotations into increasing levels of relevance based on how recently in time the existing annotations were selected or used.

30. At least one computer readable storage medium as recited in, claim 23, wherein the ranked list of annotations is further based on parsing through at least some of the existing annotations to extract text that is suitable for annotating or describing a media object.

31. At least one computer readable storage medium as recited in claim 23, wherein the suggested annotations are presented in a manner that is based on the type of device on which the suggested annotations are being presented.

32. At least one computer readable storage medium as recited in claim 23, wherein searching and ordering of the first and second sets of the existing annotations are performed without requiring that the existing annotations have a fixed format or belong to a fixed category.

33. At least one computer readable storage medium as recited in claim 23, the computer program instructions stored thereon being further arranged to receive a selection of a particular annotation by the particular user, wherein the particular user selects the particular annotation from the list of suggested annotations by clicking on or checking the particular annotation with a mouse, stylus or other input mechanism, dragging the particular annotation to the particular photograph object, entering a combination of letters for the particular annotation via a number pad of a portable or cellular phone, entering only a subset of the letters of the particular annotation via the number pad whereby the remaining letters are automatically completed, or entering the letters of the particular annotation by only tapping each number button one time whereby the particular annotation is automatically determined.

* * * * *

UNITED STATES PATENT AND TRADEMARK OFFICE
CERTIFICATE OF CORRECTION

PATENT NO. : 7,739,304 B2
APPLICATION NO. : 11/672901
DATED : June 15, 2010
INVENTOR(S) : Naaman et al.

Page 1 of 1

It is certified that error appears in the above-identified patent and that said Letters Patent is hereby corrected as shown below:

In lines 14-15 of claim 14 (column 14, lines 13-15) delete ", web-based media object collection source, a blog source, or a webpage source".

Signed and Sealed this
Twenty-seventh Day of September, 2011

David J. Kappos
*Director of the United States Patent and Trademark Office*